(12) United States Patent
Zhang

(10) Patent No.: US 11,202,445 B2
(45) Date of Patent: Dec. 21, 2021

(54) RAT CATCHING BOX

(71) Applicant: Junfeng Zhang, Guangdong (CN)

(72) Inventor: Junfeng Zhang, Guangdong (CN)

( * ) Notice: Subject to any disclaimer, the term of this patent is extended or adjusted under 35 U.S.C. 154(b) by 196 days.

(21) Appl. No.: 16/497,753

(22) PCT Filed: Apr. 25, 2017

(86) PCT No.: PCT/CN2017/081846
§ 371 (c)(1),
(2) Date: Sep. 25, 2019

(87) PCT Pub. No.: WO2018/195774
PCT Pub. Date: Nov. 1, 2018

(65) Prior Publication Data
US 2020/0022356 A1 Jan. 23, 2020

(51) Int. Cl.
*A01M 25/00* (2006.01)
*A01M 23/38* (2006.01)
*A01M 23/16* (2006.01)
(52) U.S. Cl.
CPC ............ *A01M 23/38* (2013.01); *A01M 23/16* (2013.01)
(58) Field of Classification Search
CPC ...... A01M 23/38; A01M 23/16; A01M 23/14; A01M 19/00
See application file for complete search history.

(56) References Cited

U.S. PATENT DOCUMENTS 5,918,409 A * 7/1999 Carnwath ............. A01M 19/00
43/99
7,690,147 B2 4/2010 Wetzel
(Continued)

FOREIGN PATENT DOCUMENTS

CN 202122037 1/2012
CN 102356765 2/2012
(Continued)

OTHER PUBLICATIONS

International Search Report and Written Opinion issued in International Application No. PCT/CN2017/081846 dated Jan. 25, 2018.
(Continued)

*Primary Examiner* — Joshua J Michener
*Assistant Examiner* — Henry Hooper Mudd
(74) *Attorney, Agent, or Firm* — Hogan Lovells US LLP

(57) ABSTRACT

A rat catching box includes a box body, a lifting platform, and a control assembly. The box body is provided with a trap opening and a recovery opening. The lifting platform is disposed at the bottom of the box body, and a rat catching platform parallel to the lifting platform is disposed above the lifting platform. The control assembly is disposed on the box body, and includes a voltage measurement module, a controller, a high-voltage transformer, and a power grid. The voltage measurement module transmits a triggering signal of the power grid to the controller, and the controller controls the high-voltage transformer to supply power to the power grid. The power grid includes a positive power grid line and a negative power grid line. The negative power grid line in disconnection is divided into three segments connected respectively to a negative electrode of the high-voltage transformer.

8 Claims, 3 Drawing Sheets

(56) References Cited

U.S. PATENT DOCUMENTS

2008/0196295 A1* 8/2008 Oliver ................... A01M 19/00
                                                        43/98
2015/0128480 A1* 5/2015 Pinder ................... A01M 23/14
2015/0150236 A1* 6/2015 Grant .................... A01M 23/38

FOREIGN PATENT DOCUMENTS

| CN | 102524235 | 7/2012 |
| CN | 104222062 | 12/2014 |
| EP | 2689371 | 1/2014 |
| WO | 2004030450 | 4/2004 |
| WO | 2011/098087 | 8/2011 |

OTHER PUBLICATIONS

Notice of acceptance for AU patent application issued in Application No. 2017411446, dated Oct. 8, 2020.
Notice of acceptance for NZ patent application issued in Application No. 757641, dated Jun. 17, 2020.
Examination report No. 1 for AU patent application issued in Application No. 2017411446, dated Jun. 5, 2020.
Requisition by Examiner issued in CA Application No. 3,057,726 dated Nov. 27, 2020.
Examination Report issued in EP Application No. 17907664.1 dated Jun. 5, 2020.
First Examination Report for NZ patent application issued in Application No. 757641, dated Feb. 26, 2020.

* cited by examiner

RAT CATCHING BOX

TECHNICAL FIELD

The present disclosure relates to the field of rat catching devices, and particularly to a rat catching box.

BACKGROUND ART

At present, common deratization methods include deratization by chemical methods and deratization by physical methods. Among them, deratization by chemical methods includes poison bait method, poison gas method, poison water method and poison powder method, which are the most economical methods for large-scale deratization. Deratization by physical methods is usually achieved by using rat cages, rat traps or rat glue. In addition, deratization by physical methods further includes a deratization method in which a high-voltage power line is arranged on the ground using a high-voltage transformer.

However, the above-mentioned deratization methods have the following problems: first, deratization by chemical methods can pose a threat to human and livestock and cause pollution; and second, deratization by physical methods cannot be used on a large scale, can hardly kill rats in a timely manner and cannot work continuously for a long time, moreover, the existing high-voltage power line deratization equipment can only be placed once and kill one rat at a time, cannot cut off the information source between the rats and kill the rats continuously, and has the problems of being unsafe and inconvenient, having single function and being difficult to recover the dead rats.

In view of this, it is indeed necessary to provide a safe, practical, high-efficient and tidy rat catching box.

SUMMARY

The object of the present disclosure is to overcome the defects in the prior art and provide a safe, practical, high-efficient and tidy rat catching box.

In order to achieve the object of the present disclosure, the present disclosure provides a rat catching box, comprising:

a box body, provided with a trap opening and a recovery opening;

a lifting platform, which is disposed at the bottom of the box body, and above which a rat catching platform parallel to the lifting platform is disposed; and a control assembly, disposed on the box body and comprising a voltage measurement module, a controller, a high-voltage transformer and a power grid, wherein the voltage measurement module transmits a triggering signal of the power grid to the controller, and the controller controls the high-voltage transformer to supply power to the power grid;

wherein the power grid comprises positive power grid lines and negative power grid lines, the negative power grid lines in disconnection are divided into three sections connected respectively to a negative electrode of the high-voltage transformer, and when a rat connects the middle sections of the negative power grid lines to the positive power grid lines, a triggering signal is generated.

As an improvement of the rat catching box of the present disclosure, the positive power grid lines and the negative power grid lines are alternately and densely arranged on the rat catching platform.

As an improvement of the rat catching box of the present disclosure, the positive power grid lines and the negative power grid lines are respectively connected to the high-voltage transformer.

As an improvement of the rat catching box of the present disclosure, the positive power grid lines are connected with a low-voltage power supply through a normally closed relay.

As an improvement of the rat catching box of the present disclosure, the lifting platform is provided thereon with a bait container, and the central portion of the rat catching platform is provided with a central hole facing the bait container.

As an improvement of the rat catching box of the present disclosure, the negative power grid lines are divided into a first section, a second section and a third section at the central hole.

As an improvement of the rat catching box of the present disclosure, the second section of the negative power grid lines is connected to the voltage measurement module through a normally closed relay, and the second section of the negative power grid lines is connected to the high-voltage transformer through a normally open relay.

As an improvement of the rat catching box of the present disclosure, the rat catching platform is connected, through a slide block, to a guide rail provided on an inner side surface of the box body, and the rat catching platform is connected to the slide block through a loose-leaf member.

As an improvement of the rat catching box of the present disclosure, the rat catching platform is connected to the lifting platform through a movable member, and the movable member enables the rat catching platform to be pushed by the lifting platform to be perpendicular to the bottom of the box body.

As an improvement of the rat catching box of the present disclosure, a storage battery is provided at the top of the box body, a recovery box is placed outside the box body, and the recovery box is located below the recovery opening.

Compared with the prior art, the rat catching box of the present disclosure has the following advantageous effects: 1) since rats respond more quickly to electric shock than human, reserving a sufficiently long discharge channel can increase the electric shock time before the rats escape, accordingly, to arrange the power grid densely on the rat catching platform and generate a triggering signal in the middle of the power grid reduces the escape probability of the rats after entering the box body, and the whole power grid outputs high voltage, thereby improving the efficiency for killing rats; 2) the practice that a living body acts as a resistor to turn on the power grid and then send a triggering signal reduces the probability of false alarm, and the low-voltage power supply and the voltage measurement module are low in cost and are stable and reliable; 3) the automatic recovery design of the rat catching box makes the device reset automatically after the killing is complete, and the rat catching box can be used continuously, which improves the long-lasting effect; and 4) the rat catching box integrates the functions of trapping, killing and recovery, is safe, convenient, high-efficient and tidy, has high reliability, and can be put into use on a large scale.

BRIEF DESCRIPTION OF DRAWINGS

The rat catching box of the present disclosure and the advantageous technical effects thereof are described below in detail with reference to the accompanying drawings and specific embodiments, wherein.

DETAILED DESCRIPTION OF EMBODIMENTS

Figure 1:
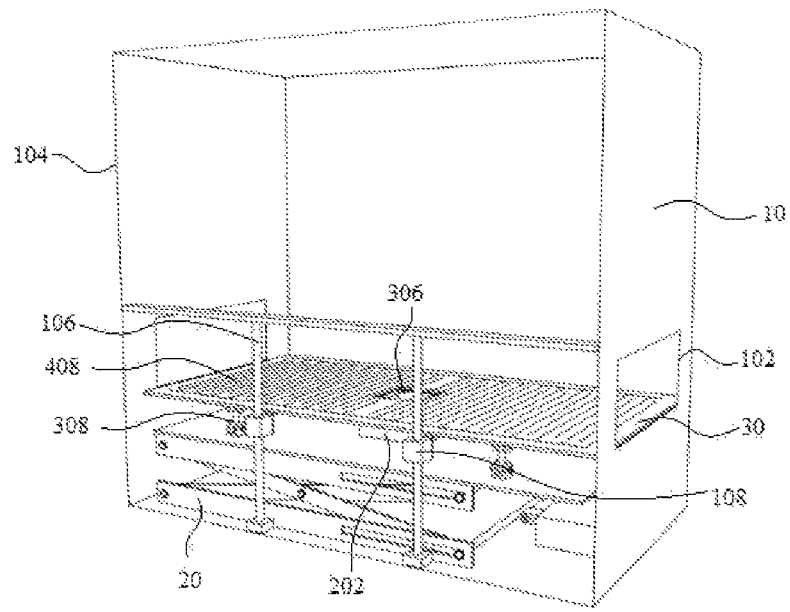
FIG. 1 is a schematic structural diagram of a rat catching box of the present disclosure.
Figure 2:
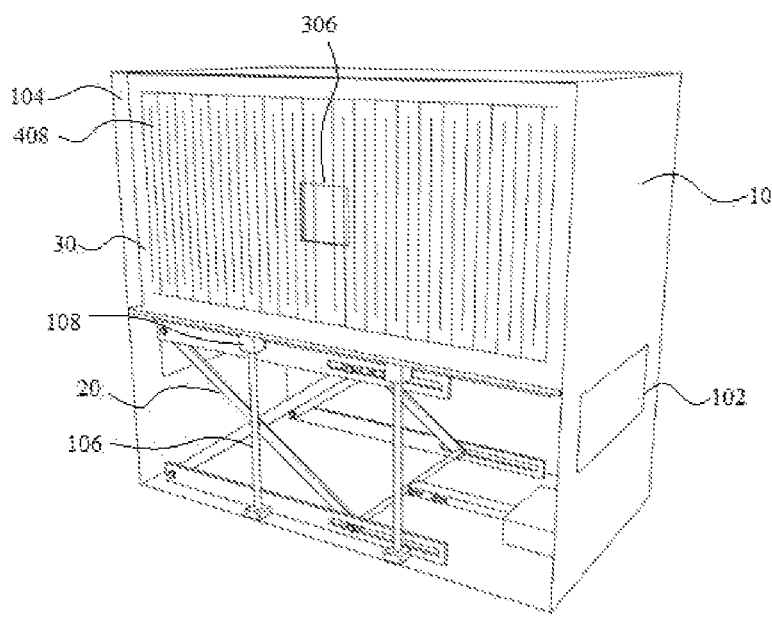
FIG. 2 is a schematic structural diagram of the rat catching box of the present disclosure, in which a rat catching platform has been lifted.
Figure 3:
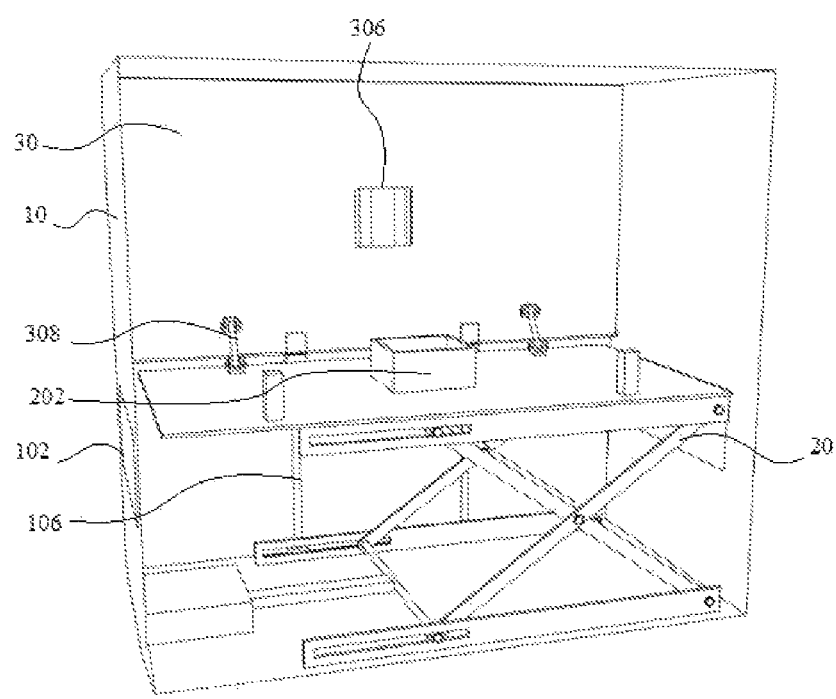
FIG. 3 is a direction-A schematic diagram of FIG. 2.

In order to make the object, technical solution and advantageous technical effects of the present disclosure clearer, the present disclosure will be further described in detail below with reference to the accompanying drawings and specific embodiments. It should be understood that the specific embodiments described in this specification are only intended to explain the present disclosure, rather than limit the same.

Referring to FIGS. 1 to 4, the rat catching box of the present disclosure comprises:

a box body 10, provided with a trap opening 102 and a recovery opening 104;

a lifting platform 20, which is disposed at the bottom of the box body 10, and above which a rat catching platform 30 parallel to the lifting platform 20 is disposed; and a control assembly 40, disposed on the box body 10 and comprising a voltage measurement module 402, a controller 404, a high-voltage transformer 406 and a power grid 408, wherein the voltage measurement module 402 transmits a triggering signal of the power grid 408 to the controller 404, and the controller 404 controls the high-voltage transformer 406 to supply power to the power grid 408;

wherein the power grid 408 comprises positive power grid lines 302 and negative power grid lines 304, the negative power grid lines 304 in disconnection are divided into three sections connected respectively to a negative electrode of the high-voltage transformer 406, and when a rat connects the middle sections of the negative power grid lines to the positive power grid lines 302, a triggering signal is generated.

According to one embodiment of the present disclosure, a storage battery is provided at the top of the box body 10, the storage battery supplies power to the whole box body 10, both sides of the box body 10 are provided with a cover plate (not shown), the recovery opening 104 is provided above the cover plate on one side of the box body 10, a recovery box is placed outside the box body 10, and the recovery box is located below the recovery opening 104.

The lifting platform 20 is provided thereon with a bait container 202, and the central portion of the rat catching platform 30 is provided with a central hole 306 facing the bait container 202. The lifting platform 20 is a scissor-type lifting platform driven by a motor 400. The motor 400 is driven by the controller 404. A rat catching platform 30 is supported above the lifting platform 20, and the two platforms are parallel and discontinuous. One side of the rat catching platform 30 is fixed to a guide rail 106 of the box body 10 by a loose-leaf member, and the guide rail 106 is provided thereon with a slide block 108, so as to lift the rat catching platform 30 in parallel with the lifting platform 20. The rat catching platform 30 is connected to the lifting platform 20 by a movable member 308, and the movable member 308 enables the rat catching platform 30 to be pushed to the rising limit point of the slide block 108 by the lifting platform 20, and then to be pushed further to be perpendicular to the bottom of the box body 10 by the lifting platform 20 through a loose-leaf member connected to the slide block 108.

Figure 4:
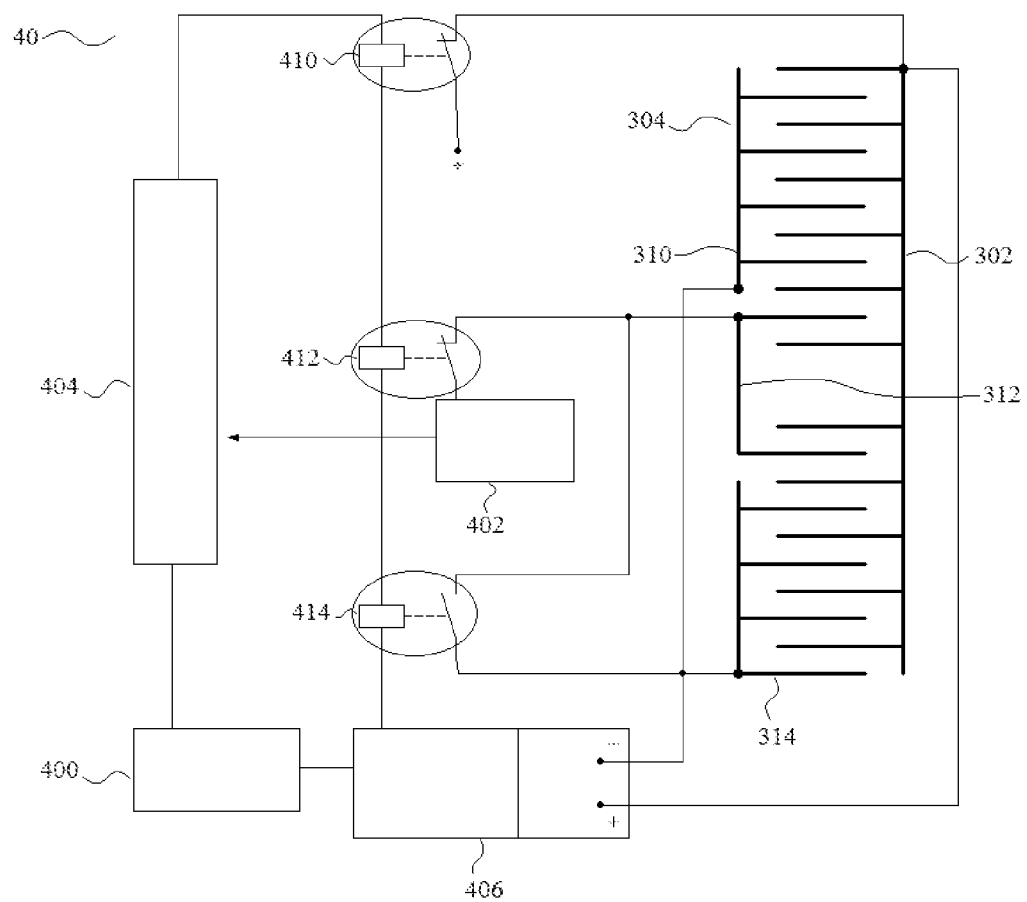
FIG. 4 is a schematic circuit diagram of a control assembly of the rat catching box of the present disclosure.

Referring to FIG. 4, the power grid 408 is disposed on the rat catching platform 30, and the positive power grid lines 302 and the negative power grid lines 304 are alternately and densely arranged on the rat catching platform 30. The positive power grid lines 302 and the negative power grid lines 304 are respectively connected to the high-voltage transformer 406, wherein the positive power grid lines 302 are connected with a low-voltage power supply through a normally closed relay 410, and the positive power grid lines 302 are also connected to the positive electrode of the high-voltage transformer 406. The negative power grid lines 304 are divided into a first section 310, a second section 312 and a third section 314 at the central hole 306, wherein the first section 310 and the third section 314 are directly connected to the negative electrode of the high-voltage transformer 406, the second section 312 is connected to the positive electrode measurement input line of the voltage measurement module 402 through a normally closed relay 412, and the second section 312 is also connected to the negative electrode of the high-voltage transformer 406 through a normally open relay 414.

Referring to FIGS. 1 to 4, the working principle of the rat catching box according to the present disclosure is as follows:

1) a bait is placed in the bait container 202, and a rat enters the rat catching platform 30 through the trap opening 102;

2) due to the principle that a living body is electrically conductive, when the rat contacts the second section 312 of the negative power grid lines 304 and the positive power grid lines 302 at the same time, the second section 312 is connected to the positive power grid lines 302, and a triggering signal is generated, which triggers the measurement voltage to reach a preset value, and the voltage measurement module 402 sends the triggering signal to the controller 404;

3) the controller 404 controls the normally closed relay 410 to change from a normally closed circuit to an open circuit to protect low-voltage power supply from being affected, the controller 404 controls the normally closed relay 412 to change from a normally closed circuit to an open circuit to protect the voltage measurement module 402 against high voltage, and the controller 404 controls the normally open relay 414 to change from a normally open circuit to a closed circuit so as to connect the negative output line of the high-voltage transformer 406;

4) the high-voltage transformer 406 enters the working output state, and the whole power grid 408 outputs high voltages to exert high-voltage electric shock on the rat;

5) after a certain period of time (which can be preset) of electric discharge, the motor 400 drives the lifting platform 20 to operate so as to raise the rat catching platform 30 to be perpendicular to the bottom of the box body 10, and the rat after electric shock falls into the recovery box; and 6) the whole device is reset.

As can be seen from the above description, compared with the prior art, the rat catching box of the present disclosure has the following advantageous effects: 1) since rats respond more quickly to electric shock than human, reserving a sufficiently long discharge channel can increase the electric shock time before the rats escape, accordingly, to arrange the power grid 408 densely on the rat catching platform 30 and generate a triggering signal in the middle of the power grid 408 reduces the escape probability of the rats after entering the box body 10, and the whole power grid 408 outputs high voltages, thereby improving the efficiency for killing rats; 2) the practice that a living body acts as a resistor to turn on the power grid 408 and then send a triggering signal reduces the probability of false alarm, and the low-voltage power supply and the voltage measurement module 402 are low in cost and are stable and reliable; 3) the automatic recovery design of the rat catching box makes the device reset automatically after the killing is complete, and the rat catching box can be used continuously, which improves the long-lasting effect; and 4) the rat catching box integrates the functions of trapping, killing and recovery, is safe, convenient, high-efficient and tidy, has high reliability, and can be put into use on a large scale.

A person skilled in the art of the present disclosure may also make appropriate changes and modifications to the above-described embodiments in accordance with the disclosure and teaching of the specification. Accordingly, the present disclosure is not limited to the specific embodiments disclosed and described above, and some modifications and changes to the present disclosure should also fall within the scope of protection of the claims of the present disclosure. In addition, although some specific terms are used in this specification, these terms only serve to facilitate description, rather than constitute any limitation on the present disclosure.

The invention claimed is:

1. A rat catching box, comprising:
a box body, provided with a trap opening and a recovery opening;
a lifting platform, disposed at a bottom of the box body, wherein a rat catching platform parallel to the lifting platform is disposed above the lifting platform, wherein the lifting platform is provided thereon with a bait container, and a central portion of the rat catching platform is provided with a central hole facing the bait container; and
a control assembly, disposed on the box body and comprising a voltage measurement module, a controller, a transformer and a power grid, wherein the voltage measurement module is configured to transmit a triggering signal of the power grid to the controller, and the controller is configured to control the transformer to supply power to the power grid,
wherein the power grid comprises positive power grid lines and negative power grid lines, the positive power grid lines and the negative power grid lines are alternately arranged on the rat catching platform, and the negative power grid lines are divided into three sections connected respectively to a negative electrode of the transformer, wherein when a rat connects middle sections of the negative power grid lines to the positive power grid lines, the triggering signal is generated.

2. The rat catching box according to claim 1, wherein the positive power grid lines and the negative power grid lines are respectively connected to the transformer.

3. The rat catching box according to claim 1, wherein the positive power grid lines are connected with a power supply through a normally closed relay.

4. The rat catching box according to claim 1, wherein the negative power grid lines are divided into a first section, a second section and a third section at the central hole.

5. The rat catching box according to claim 4, wherein the second section of the negative power grid lines is connected to the voltage measurement module through a normally closed relay, and the second section of the negative power grid lines is also connected to the transformer through a normally open relay.

6. The rat catching box according to claim 1, wherein the rat catching platform is connected, through a slide block, to a guide rail provided on an inner side surface of the box body, and the rat catching platform is connected to the slide block through a loose-leaf member.

7. The rat catching box according to claim 1, wherein the rat catching platform is connected to the lifting platform through a movable member, and the movable member is configured to enable the rat catching platform to be pushed by the lifting platform to be perpendicular to the bottom of the box body.

8. The rat catching box according to claim 1, wherein a storage battery is provided at a top of the box body, a recovery box is placed outside the box body, and the recovery box is located below the recovery opening.

* * * * *